United States Patent [19]

Pethers

[11] Patent Number: 5,073,060
[45] Date of Patent: Dec. 17, 1991

[54] PIVOT JOINT
[75] Inventor: Peter C. Pethers, London, England
[73] Assignee: Trico Products Corporation, Buffalo, N.Y.
[21] Appl. No.: 391,749
[22] Filed: Aug. 9, 1989
[30] Foreign Application Priority Data Aug. 9, 1988 [GB] United Kingdom ............... 8818861

[51] Int. Cl.⁵ ............................................. B60S 1/38
[52] U.S. Cl. ................................ 403/405.1; 403/119; 403/217; 403/363; 15/250.32; 15/250.42
[58] Field of Search ............... 403/119, 217, 247, 253, 403/363, 405.1, 43, 67, 161, 164; 15/250.42, 250.30, 250.35

[56] References Cited

U.S. PATENT DOCUMENTS

| | | | |
|---|---|---|---|
| 3,883,920 | 5/1975 | Harbison et al. | 15/250.42 |
| 4,009,504 | 3/1977 | Arman | 15/250.42 |
| 4,090,746 | 5/1978 | Harkins et al. | 403/225 X |
| 4,286,351 | 9/1981 | Mower et al. | 403/303 X |
| 4,616,060 | 10/1986 | Killgoar, Jr. | 15/250.42 X |
| 4,675,934 | 6/1987 | Dal Palu | 15/240.42 |
| 4,788,736 | 12/1988 | Arai et al. | 403/155 X |
| 4,795,288 | 1/1989 | Sakai | 403/153 X |
| 4,896,987 | 1/1990 | Pethers | 403/24 |
| 4,909,653 | 3/1990 | Biggs | 403/24 |

FOREIGN PATENT DOCUMENTS 2038167 7/1980 United Kingdom .
2202272 9/1988 United Kingdom .
2202899 10/1988 United Kingdom .
2203485 10/1988 United Kingdom .

Primary Examiner—Randolph A. Reese
Assistant Examiner—Franco S. De Liguori
Attorney, Agent, or Firm—Joseph G. Nauman

[57] ABSTRACT

A pivot joint comprising a first member (1) of generally channel section at least in the region of the joint, a second member (2) to which the first member (1) is to be pivotally connected and which is adapted to lie at least partially within the first member (1) in the region of the joint and a joint body (4) adapted to lie around the second member (2) while being largely contained within the channel of the first member (1). The channel section of the first member (1) has at least one wall (7) at an obtuse angle to the base of the channel so that the channel has a wider mouth than the base, the cross section of the channel being trapezoidal. The joint body (4) is shaped exteriorly to complement the interior of the channel and is provided with a pair of external trunnions (54,56) aligned with corresponding apertures (12,13) in the first member (10) and with means (62,64) for attaching the joint body (4) to the second member (2). The materials of the joint and the arrangement of the parts (1,2,4) are such that the sides of the channel of the first member (1) can flex sufficiently to allow the second member (2) together with the joint body (4) to be snapped into the channel of the first member (1), the trunnions (54,56) of the joint body (4) being thereby inserted into the apertures (12,13) in the first member (1) to complete the joint.

11 Claims, 2 Drawing Sheets

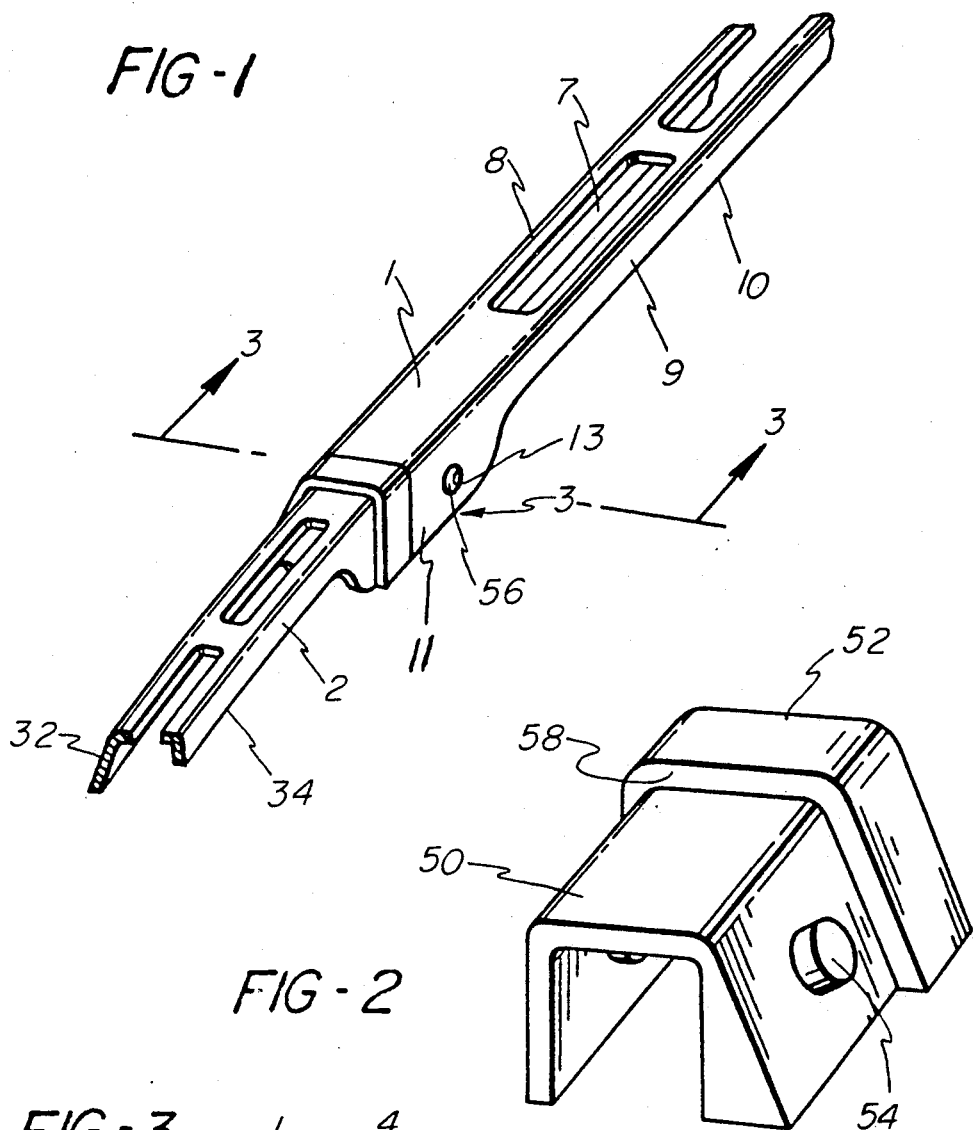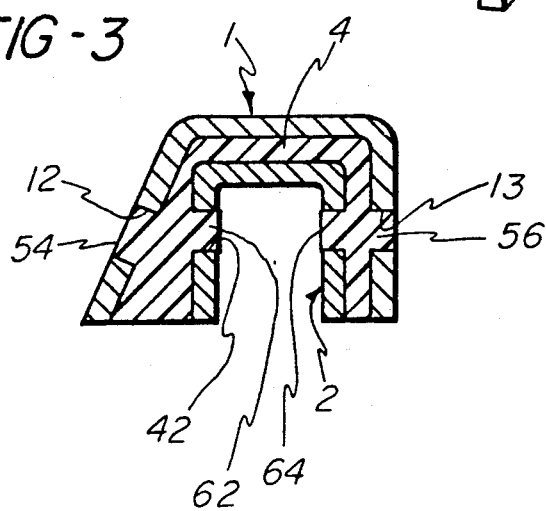

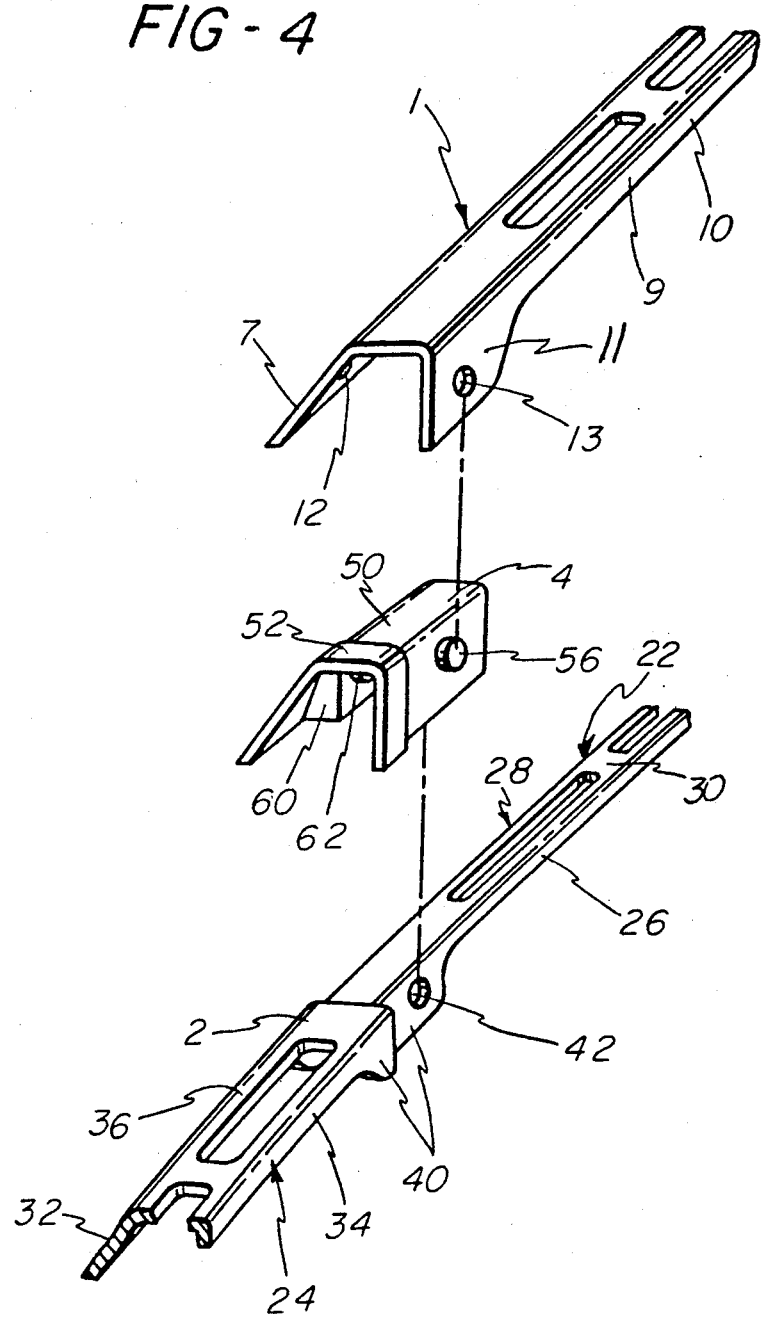

PIVOT JOINT

This invention relates to a pivot joint which is particularly but not exclusively useful in the manufacture of windscreen wipers.

In the manufactue of windscreen wipers, a number of pivot joints are used, particularly between the arm and blade and between the various yokes and/or levers of the blade itself.

Problems exist in the manufacture of windscreen wipers due to the necessity, very often, of pivoting metal parts together. These tend to be noisey and have a tendency to suffer from wear and corrosion. Various proposals have been made for overcoming these problems, for example, by the provision of plastics members between the metal of the joints, but these have not proved entirely satisfactory from a manufacturing standpoint although they have worked satisfactorily in practice.

In particular, problems have been caused by the necessity, during manufacture, to insert pivot pins into the joints, thus increasing the manufacturing costs and the number of parts involved. One proposals to overcome this resided in the provision of moulded on trunnions to replace the pivot pins. This, however, gave problems in assembly since the outer member of the joint could no longer be slid over the inner member and had to be folded around it. In some circumstances, this caused overstressing of the material of the outer member resulting in damage to the surface treatment thereof and giving rise to corrosion problems.

The present invention seeks to provide a pivot joint in which some or all of the above problems are reduced or substantially obviated.

According to the invention, a pivot joint comprises a first member of generally channel section at least in the region of the joint, a second member to which the first member is to be pivotally connected and which is adapted to lie at least partially within the first member in the region of the joint and a joint body adapted to lie around the second member while being largely contained within the channel of the first member, wherein the channel section of the first member has at least one wall at an obtuse angle to the base of the channel so that the channel has a wider mouth than the base, the cross section of the channel being trapezoidal, and wherein the joint body is shaped exteriorly to complement the interior of the channel and is provided with a pair of external trunnions aligned with corresponding apertures in the first member and with means for attaching the joint body to the second member, the materials of the joint and the arrangement of the parts of the joint being such that the sides of the channel of the first member can flex sufficiently to allow the second member together with the joint body to be snapped into the channel of the first member, the trunnions of the joint body being thereby inserted into the apertures in the first member to complete the joint.

One wall of the channel may be at right angles to the base of the channel and the other wall may be at an obtuse angle thereto.

Preferably the first member is formed of metallic material such as zinc coated mild steel or stainless steel sheet while the joint body is moulded from a plastics material such as acetyl resin or nylon. The invention will now be described in greater detail, by way of example, with reference to the drawings, in which:

FIG. 1 is a perspective view of a pivot joint in accordance with the invention as applied to the connection between the main and secondary yokes of a windscreen wiper;

FIG. 2 is a perspective view of the joint body used in the joint in FIG. 1;

FIG. 3 is a sectional view of the joint taken on the line III—III of FIG. 1, and FIG. 4 is an exploded view of the joint of FIG. 1 for use in describing methods of assembly of the joint.

Referring firstly to FIG. 1, a pivot joint comprises a first member 1 in the form of the main yoke of a windscreen wiper blade and a second member 2 in the form of a secondary yoke, the two yokes 1 and 2 being pivotally connected together by means of a joint body 4. Both yokes 1 and 2 are preferably constructed from metal sheet suitable of zinc coated mild steel or stainless steel while the joint body 4 is moulded from a suitable plastics material such as acetyle resin or nylon.

The main yoke 1 is of substantially channel shaped section at the joint 3, one side 7 of the channel and the base 8 thereof extending beyond the joint region and the other side 9 being cut back as at 10 in the region away from the joint for aerodynamic purposes in connection with the use of the windscreen wiper. As the joint, the side 9 has the form of a depending ear 11. The side 7 which is not cut away extends at an obtuse angle to the channel base 8 while the other side 9 is at right angles thereto. Both channel sides (7 and 9) of the main yoke 1 have a circular aperture 12 and 13 respectively.

As can best be seen from FIG. 4, the second yoke 2 is also of channel section, but comprises a narrow part 22 and a wider part 24. The part 22 has both channel sides 26 and 28 at right angles to the base 30 while the wider part 24 has an obtuse side 32 and a right angled side 34, both as considered in relation to the base portion 36. Thus the wider part 24 follows the line of the main yoke 1 while the narrow part 22, which when assembled, lies beneath the main yoke 1, does not. The sides 26 and 28 of the narrow part 22 and the side 34 of the wider part 24 are enlarged in the region of the joint 3 to effectively provide depending ears 40, suitably circularly circular apertured at 42.

The joint body 4 is best seen from FIGS. 2 and 3. It comprises a generally channel shaped member having a main portion 50 and an enlarged end portion 52. The main portion 50 has an exterior which is complementary to the interior surface of the main yoke with the addition of circular trunnions 54 and 56 which cooperate with circular apertures 12 and 13 respectively of the main yoke 1. It will be seen that, due to the obtuse angle of the side 7 of the main yoke 1, the trunnion 54 lies at an angle to the trunnion 56. The shape of the enlarged end portion 52 is intended to continue the exterior shape of the main yoke 1 as closely as possible and the shoulder 58 between the main and end portions acts to close the open end of the main yoke 1. The inner surface of the joint body 4 is generally complemenataty to the exterior of the secondary yoke 2 and to this end is formed with an internal shoulder 60 which allows for the transition between the narrow portion 22 and the wider portion 24 of secondary yoke. Two aligned circular trunnions 62 and 64 are provided in the inner surface of the joint body for cooperation with the circular apertures 42 in the secondary yoke 2. It is to be noted that sufficient play must be possible between the secondary yoke 2 and the joint body 4 to permit the necessary pivoting between them.

Assembly of the joint will now be described with particular reference to FIG. 4:

Firstly, the joint body 4 is positioned over the secondary yoke 2 and is pushed down home. This flexes the sides of the joint body 4 enabling the trunnions 62 and 64 to pass around the sides 26 and 28 of the secondary yoke. When the joint body is pushed fully home, the trunnions 62 and 64 will click into the circular apertures 42 in the secondary yoke 2, thus pivotally securing the joint body 4 and the secondary yoke together.

Next, the secondary yoke 2 together with the attached joint body 4 is offered up into the end of the main yoke 1. It is suggested that the secondary yoke is offered up at a slant angle so that the trunnion 56 first engages in the circular aperture 13 of the main yoke 1. Then the secondary yoke can be twisted and pushed up so as to engage the trunnion 54 in the circular aperture 12 of the main yoke. In this way, a very slight degree of flexing of the side 7 of the main yoke can be achieved. This flexing is sufficient because of the obtuse angle of the side 7. Such flexing is not possible with sides joining the base portion at right angles. It will of course be realized that the effectiveness of this operation relies on the main yoke being made out of suitable sheet metal, but it has been found that the sheet metal usually used for the yokes of windscreen wipers works satisfactorily.

While it is not usually necessary to provide for detachment of the pivot joints of windscreen wiper blade harnesses, it is in fact possible to reverse the assembly procedure by forcing the sides of the main yoke very slightly apart to release the trunnion 54. The removal of the joint body from the secondary yoke can be achieved by pushing the sides of the joint body apart, which is relatively easily achieved due to the resilience of the plastics material of which it is made.

It will be appreciated that various modifications may be made to the above described embodiment without departing from the scope of the invention. For example, if required, the secondary yoke could be made of plastics material instead of from metal sheet. The angled trunnion 54 of the joint body 4 could be aligned with the other trunnions of the joint body with suitable positioning of the aperture 12 in the main yoke 1. It is not necessary for the axes of the trunnions 62 and 64 to be aligned with the trunnion 56 and/or 54.

It is also possible, by suitable construction of the joint body 4, to provide the pivot between the joint body 4 and the main yoke 1 rather than between the joint body 4 and the secondary yoke 2. The trunnions and the apertures of the non pivoting parts could be of other than circular if desired. Also the end 52 of the joint body could be omitted.

From the above, it will be seen that the described pivot joint enables an easy assembly of the joint, which can be particularly suitable for assembly by automatic machinery. No additional parts, such as pivot pins are required and no forming operations are necessary once the various parts have been manufactured.

What is claimed is:

1. A pivot joint comprising a first member of generally channel section having a base and opposed sides defining a channel at least in the region of the joint, a second member to which said first member is to be pivotally connected and which is adapted to lie at least partially within said first member in the region of the joint, and a joint body adapted to lie around said second member while being largely contained within said channel of said first member, one of said opposed side of said channel section of said first member extending at an obtuse angle to the base of said channel, the cross section of said channel being trapezoidal, said joint body being shaped exteriorly to complement the interior of said channel of said first member and being provided with a pair of external trunnions, means defining corresponding apertures in the opposite sides of said first member adapted to be aligned with said trunnions, and means for attaching said joint body to said second member, the materials of the pivot joint and the arrangement of the parts of the pivot joint being such that said one obtuse side of said channel of said first member being resiliently flexible sufficiently to allow said second member together with said joint body to be snapped into said channel of said first member, said trunnions of said joint body being thereby inserted into the apertures in the opposed sides of said first member to complete the joint.

2. A pivot joint as claimed in claim 1, wherein said one wall of side of the channel section opposite said at least one wall is at right angles to said base.

3. A pivot joint as claimed in claim 1, wherein said first member is formed of metallic material while said joint body is formed of a plastics material.

4. A pivot joint as claimed in claim 3, wherein said first member is formed from zinc coated mild steel sheet.

5. A pivot joint as claimed in claim 3, wherein said first member is formed from stainless steel sheet.

6. A pivot joint as claimed in claim 3, wherein said joint body is moulded from acetyl resin.

7. A pivot joint as claimed in claim 3, wherein said joint body is moulded from nylon.

8. A pivot joint as claimed in claim 3, wherein said second member is also formed of metallic material.

9. A pivot joint as claimed in claim 3, wherein said second member is formed of a suitable plastics material.

10. A pivot joint as claimed in claim 1, wherein said first and second members comprise yokes of a harness of a windscreen wiper blades.

11. A pivot joint, comprising:

a first member of generally channel section having a base and opposed sides defining a channel at least in the region of the joint, and of said opposed sides of said channel section of said first member extending at an obtuse angle to the base of said channel to define an obtuse side, the cross section of said channel being trapezoidal, said side of said channel opposite said obtuse side having a first aperture therethrough and said obtuse side having a second aperture therethrough;

a second member to which said first member is to be pivotally connected and which is adapted to lie at least partially within said first member in the region of the joint; and a joint body profiled to lie around said second member while being largely contained within said channel of said first member, said joint body comprising: a first wall profiled to lie substantially adjacent to said side of said channel opposite said obtuse side, an obtuse wall profiled to lie substantially adjacent to said obtuse side of said channel an external trunnion on said first wall, an external trunnion on said obtuse wall and means for attaching said joint body to said second member; said joint body together with said second member being adapted for receipt within said channel, said trunnion on said first wall being insertable into said first aperture, said joint body being pivotal, said obtuse wall being movable towards said obtuse side of said channel, said obtuse side of said channel being resiliently flexible sufficiently to allow said trunnion of said obtuse wall to be snapped into said second aperture to complete the joint.

* * * * *